(12) United States Patent
Baldemair et al.

(10) Patent No.: US 8,717,908 B2
(45) Date of Patent: May 6, 2014

(54) COMPONENT CARRIER SELECTION METHOD AND APPARATUS FOR RANDOM ACCESS ATTEMPTS IN A COMMUNICATIONS NETWORK

(75) Inventors: Robert Baldemair, Solna (SE); Mats Sågfors, Kyrkslätt (FI); Magnus Stattin, Sollentuna (SE)

(73) Assignee: Optis Cellular Technology, LLC, Plano, TX (US)

( * ) Notice: Subject to any disclaimer, the term of this patent is extended or adjusted under 35 U.S.C. 154(b) by 58 days.

(21) Appl. No.: 13/505,160

(22) PCT Filed: Mar. 11, 2010

(86) PCT No.: PCT/SE2010/050272
§ 371 (c)(1),
(2), (4) Date: Apr. 30, 2012

(87) PCT Pub. No.: WO2011/053215
PCT Pub. Date: May 5, 2011

(65) Prior Publication Data
US 2012/0218903 A1   Aug. 30, 2012

Related U.S. Application Data

(60) Provisional application No. 61/257,147, filed on Nov. 2, 2009.

(51) Int. Cl.
*H04J 3/14* (2006.01)

(52) U.S. Cl.
USPC ........... 370/242; 370/329; 370/345; 370/445; 370/252; 455/422.1; 455/414.4

(58) Field of Classification Search
USPC ......... 370/242, 329, 328, 345, 445, 252, 347; 455/422.1, 414.4
See application file for complete search history.

(56) References Cited

U.S. PATENT DOCUMENTS

| | | | | |
|---|---|---|---|---|
| 2001/0026539 | A1* | 10/2001 | Kornprobst et al. | 370/329 |
| 2001/0036113 | A1* | 11/2001 | Jurgensen et al. | 365/200 |
| 2004/0156353 | A1* | 8/2004 | Bevan et al. | 370/351 |
| 2008/0279146 | A1* | 11/2008 | Cave et al. | 370/329 |

OTHER PUBLICATIONS

Choi, H.-H. et al. "Adaptive Random Access and Resource Allocation Scheme based on Traffic Load in HiperLAN Type2 System." IEEE Communications Letters, vol. 7, Issue 4, Apr. 2003.

(Continued)

*Primary Examiner* — Charles C Jiang
*Assistant Examiner* — Jamal Javaid
(74) *Attorney, Agent, or Firm* — Vincent J. Allen; Carstens & Cahoon, LLP

(57) ABSTRACT

Methods and apparatus for selecting component carriers for random access attempts. A user equipment arranged to communicate with the base station over multiple component carriers, selects a component carrier from the multiple component carriers, based on a likelihood, and transmits a random access attempt to the base station over the selected component carrier. After maintaining statistics of component carriers selected for random access attempts per component carrier of the multiple component carriers, the user equipment adjusts the likelihood of selecting a specific component carrier for a subsequent transmission of a random access attempt based on the maintained statistics.

10 Claims, 5 Drawing Sheets

(56) References Cited

OTHER PUBLICATIONS

Naor, Z. et al. "A Centralized Dynamic Access Probability Protocol for Next Generation Wireless Networks." Twentieth Annual Joint Conference of the IEEE Computer and Communications Societies, vol. 2, 2001.

Sun, L. et al. "An Adaptive Random Access Protocol for OFDMA System." 2007 IEEE 66th Vehicular Technology Conference, Sep. 30-Oct. 3, 2007.

3rd Generation Partnership Project. "On DL Component Carrier Ambiguity in Initial Random Access Procedure." 3GPP TSG RAN WG2 Meeting #68, R2-096771, Jeju, Korea, Nov. 9-13, 2009.

\* cited by examiner

Aggregated bandwidth of 100 MHz

COMPONENT CARRIER SELECTION METHOD AND APPARATUS FOR RANDOM ACCESS ATTEMPTS IN A COMMUNICATIONS NETWORK

TECHNICAL FIELD

The present invention relates to a method and an arrangement in a user equipment. In particular, it relates to improvements of selecting random access resources.

BACKGROUND

In a typical cellular radio system, also referred to as a wireless communication system, user equipments, also known as mobile terminals and/or wireless terminals communicate via a Radio Access Network (RAN) to one or more core networks. The user equipments may be mobile stations or user equipment units such as mobile telephones also known as "cellular" telephones, and laptops with wireless capability, e.g., mobile termination, and thus may be, for example, portable, pocket, hand-held, computer-included, or car-mounted mobile devices which communicate voice and/or data with radio access network. The user equipments may also be referred to as terminals or a UE:s.

The radio access network covers a geographical area which is divided into cell areas, with each cell area being served by a base station, e.g., a Radio Base Station (RBS), which in some networks is also called "eNB", "eNodeB", "NodeB" or "B node". A cell is a geographical area where radio coverage is provided by the radio base station equipment at a base station site. The base stations communicate over the air interface operating on radio frequencies with the user equipments within range of the base stations.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. In the end of 2008 the first release, Release 8, of the 3GPP Long Term Evolution (LTE) standard was finalized and the release 9 and 10 is currently going on.

Carrier Aggregation

The LTE Rel-8 standard supports bandwidths up to 20 MHz. However, in order to meet the International Mobile Telecommunications Advanced (IMT-Advanced) requirements, 3GPP has initiated work on LTE Rel-10 which also is referred to as LTE-Advanced. One of the parts of LTE-Advanced is to support bandwidths larger than 20 MHz. One important requirement on LTE-Advanced is to assure backward compatibility with LTE Rel-8. This should also include spectrum compatibility. That would imply that an LTE-Advanced carrier, wider than 20 MHz, should appear as a number of LTE carriers to an LTE Rel-8 terminal. Each such carrier can be referred to as a Component Carrier (CC). In particular for early LTE-Advanced deployments it can be expected that there will be a smaller number of LTE-Advanced-capable terminals compared to many LTE legacy terminals. A legacy terminal is a terminal from a previous release or generation. Therefore, it is necessary to assure an efficient use of a wide carrier also for legacy terminals, i.e. that it is possible to implement carriers where legacy terminals can be scheduled in all parts of the wideband LTE-Advanced carrier. The straightforward way to obtain this would be by means of carrier aggregation. Carrier aggregation implies that an LTE-Advanced terminal can receive multiple CCs, where the CCs have, or at least has the possibility to have, the same structure as a Rel-8 carrier. An example of carrier aggregation is illustrated in FIG. 1, wherein an aggregated bandwidth of 100 MHz is divided into five CCs, each one with an individual bandwidth of 20 MHz.

The number of aggregated CCs as well as the bandwidth of the individual CC may be different for Uplink (UL) and Downlink (DL). A symmetric configuration refers to the case where the number of CCs in DL and UL is the same whereas an asymmetric configuration refers to the case that the number of CCs is different. It is important to note that the number of CCs configured in a cell may be different from the number of CCs seen by a terminal: A terminal may for example support more DL CCs than UL CCs, even though the cell is configured with the same number of UL and DL CCs.

In case of an asymmetric configuration both cases can be envisioned, a higher number of DL CCs but also that the number of UL CCs exceeds the number of DL CCs.

Random Access

In modern cellular radio systems, the radio network has a strict control on the behavior of the terminal. Uplink transmission parameters like frequency, timing, and power are regulated via downlink control signaling from the base station to the terminal.

At power-on or after a long standby time, the user equipment is not synchronized in the uplink. The user equipment may derive an uplink frequency and power estimate from the downlink (control) signals. However, a timing estimate is difficult to make since the round-trip propagation delay between the eNodeB, i.e. the LTE radio base station, and the user equipment is unknown. So even if user equipment uplink timing is synchronized to the downlink, it may arrive too late at the eNodeB receiver because of the propagation delays. Therefore, before commencing traffic, the user equipment has to carry out a Random Access (RA) procedure to the network. After the RA, eNodeB can estimate the uplink timing misalignment of the user equipment and send a correction message. During the RA, uplink parameters like timing and power are not very accurate. This poses extra challenges to the dimensioning of a RA procedure.

Usually, a Physical Random Access Channel is provided for the user equipment to request access to the network. A RA preamble is used which is based on a specific sequence with good auto-correlation. Because multiple user equipments can request access at the same time, collisions may occur between requesting user equipments. A contention resolution scheme has to be implemented to separate the user equipment transmissions. To distinguish between different user equipments performing RA typically many different preambles exist. A user equipment performing RA randomly picks a preamble out of a pool and transmits it. The preamble represents a random user equipment Identity (ID) which may be used by the eNodeB when granting the user equipment access to the network. The eNodeB receiver may resolve RA attempts performed with different preambles and send a response message to each user equipment using the corresponding random user equipment IDs. In case that multiple user equipments simultaneously use the same preamble a collision occurs and most likely the RA attempts are not successful since the eNodeB cannot distinguish between the two users with the same random user equipment ID.

To minimize the probability of collision, the set of available sequences should be large. In LTE the number of provided sequences per cell and RA opportunity may for example be 64.

Preambles assigned to adjacent cells are typically different to insure that a RA in one cell does not trigger any RA events in a neighboring cell.

LTE defines different RA configurations that differ in the amount of offered RA opportunities. A RA opportunity is approximately 1 MHz wide and either 1, 2, or 3 ms long within which the terminal can transmit the RA preamble. In the configuration with the lowest number of opportunities one opportunity is offered every second radio frame, i.e. every 20 ms. On the other extreme the configuration with the highest density of RA opportunity offers one RA opportunity every subframe, i.e. every ms.

The eNodeB receiver listens at all RA opportunities to detect preambles. In case a preamble is successfully detected a RA response that includes the number of the detected preamble is sent in a special message on the DL. A terminal that has recently performed a RA attempt is listening within a certain time window after the preamble has been sent on the DL to receive a RA response. In case of a successful reception of the RA response the terminal continues with the RA procedure by the terminal sending a message to the base station. This message is scrambled with scrambling code depending on TC-RNTI (obtained in the RA response) and contains user equipment identity (not the same as TC-RNTI). Thereafter the base station transmits contention resolution message including user equipment identity (not TC-RNTI). Terminal checks if the user equipment identity is identical to the identity previously transmitted. If not, a new RA attempt is done.

In case no RA response is received within the specified window a new attempt is made. The power of this new preamble transmission is increased by a configured step size relative to the previous attempt. Depending on the backoff parameter in the user equipment a user equipment may immediately re-try or wait for a random time depending on the configured backoff time prior a new attempt. If the number of unsuccessful RA attempts exceeds a configured threshold the user equipment does not try any further but declares a radio link failure.

In addition to above described procedure, which is the contention based RA procedure, LTE defines also the contention free RA procedure where the base station assigns the exact RA resources to the user equipment. The assigned resources are exclusively used by one user equipment, therefore no collisions can occur.

In case of carrier aggregation, a user equipment may be configured to operate with multiple UL CCs. Depending on the carrier configuration one or multiple of these carriers may contain RA opportunities. We note that even in case that multiple UL CCs contain RA opportunities a user equipment may only be allowed on a subset of these carriers to perform RA. On reason for this is RA load balancing. If we have multiple UL CC and the UE is configured with multiple of them we may anyway want to have some control which CC can be used by which UE for RACH, e.g. UE1: CC1 and CC2 and UE2: CC2 and CC3. Another reason is that the RA response needs to be transmitted on the CC that is linked to the UL CC that has been used for RA. In DL a UE may activate CC and a DL CC needs to be activated on the UE to receive data. If a UE would now transmit RACH on an UL CC but the corresponding DL CC is not activated the UE could not receive RA response. This may be another reason why not all configured UL CC with RA opportunities on them can be used.

However, it is advantageous to allow a user equipment to use RA opportunities on multiple UL CCs 0. By doing this RA load can be distributed among the carriers. Choosing RA opportunities on multiple CCs increases frequency diversity which improves link performance and probability of a successful attempt. This reduces latency. The selection which CCs to choose may e.g. be done randomly with a uniform distribution.

The reason why RA attempts sometime fail may be that the received RA preamble power is too low and cannot be detected by the eNodeB. Reasons for this may be that the uplink experiences a deep fade or that the RA preamble transmission power is set too low. The latter is a systematic error based on an inaccurate path gain estimation which is present in all subsequent RA attempts. Since each RA attempt is transmitted with an increased power this systematic error becomes of course smaller, but it may take several attempts until the required power level is reached. In the extreme case—if the initial power error is very large—the required power may not be reached in any subsequent attempt. If the first selected CC has a wrong power setting and is selected several times in a row all subsequent attempts probably fail as well.

SUMMARY

A pure uniformly distributed component carrier selection for RA does not prevent a user equipment to choose several times in a row the same component carrier before selecting a different component carrier.

Pure uniformly distributed random selection does therefore not only lead to a bad radio resource usage, since RA has to be performed unnecessarily often, but also leads to longer delays when accessing the system.

The object of the present solution is therefore to provide a method and arrangement that improves the random access performance.

According to a first aspect of the invention, the object is achieved by a method in a user equipment for selecting component carriers for random access attempts. The user equipment is arranged to communicate with the base station over multiple component carriers. The user equipment selects a component carrier from the multiple component carriers, based on a likelihood, and transmits a random access attempt to the base station over the selected component carrier. After maintaining statistics of component carriers selected for random access attempts per component carrier of the multiple component carriers, the user equipment adjusts the likelihood of selecting a specific component carrier for a subsequent transmission of a random access attempt based on the maintained statistics.

According to a second aspect of the invention, the object is achieved by a user equipment for selecting component carriers for random access attempts. The user equipment is arranged to communicate with the base station over multiple component carriers. The user equipment comprises a selecting unit configured to select a component carrier from the multiple component carriers based on a likelihood. The user equipment further comprises a transmitter unit configured to transmit a random access attempt to the base station over the selected component carrier. The user equipment further comprises a statistics maintaining unit configured to maintain statistics of component carriers selected for random access attempts per component carrier of the multiple component carriers. The user equipment further comprises an adjusting unit configured to adjust the likelihood of selecting a specific component carrier for a subsequent transmission of a random access attempt based on the maintained statistics.

Since statistics of component carriers selected for random access attempts per component carrier of the multiple component carriers are maintained and since the likelihood of selecting a specific component carrier for a subsequent transmission of a random access attempt is adjusted based on the maintained statistics instead of having a pure random selection, unsuccessful attempts on the same component carrier can be avoided, which in turn improves the random access performance.

Other objects, advantages and novel features of the invention will become apparent from the following detailed description of the invention when considered in conjunction with the accompanying drawings and claims.

An advantage with embodiments of the invention is that it provides reduced latency.

A further advantage with embodiments of the invention is that it enables load balancing and frequency diversity even if RA opportunities are aggressively staggered on the multiple component carriers.

BRIEF DESCRIPTION OF THE DRAWINGS

The invention is described in more detail with reference to attached drawings illustrating exemplary embodiments of the invention and in which.

DETAILED DESCRIPTION

The present invention can be exemplified in the following non-limiting description of embodiments of the invention.

Figure 1:
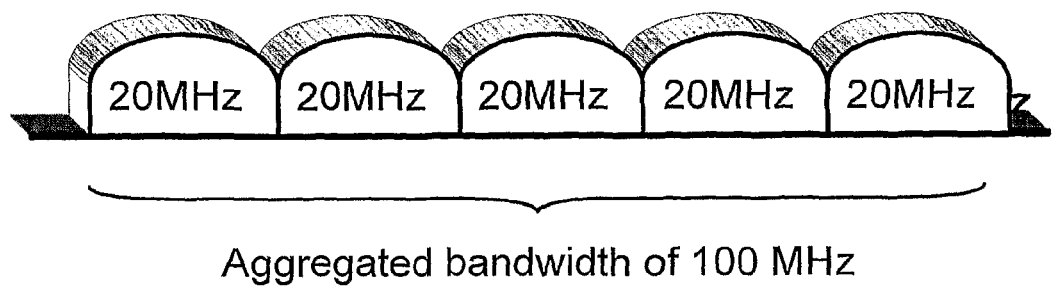
FIG. 1 is a schematic block diagram illustrating aggregated bandwidth according to prior art.
Figure 2:
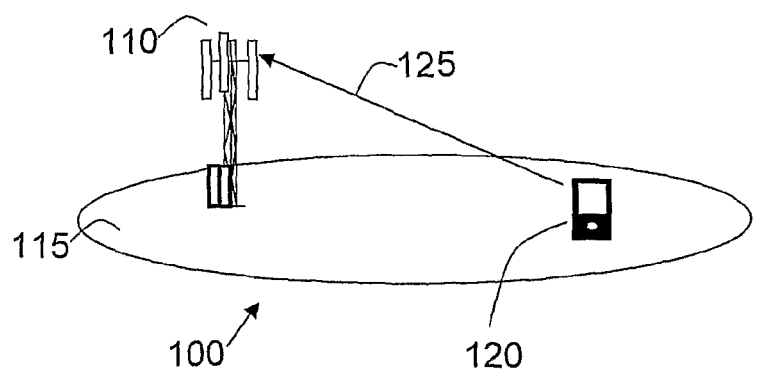
FIG. 2 is a schematic block diagram illustrating embodiments of a wireless communication system.

FIG. 2 depicts a wireless communications system 100 in which the present solution is implemented. The wireless communications system 100 may be an LTE communications system, a Worldwide Interoperability for Microwave Access (WiMAX) communications system, a WCDMA communications system, or any other wireless communications system using multiple uplink component carriers.

The wireless communications system 100 comprises a base station 110 serving a cell 115. The base station 110 is a radio base station such as an eNB, or any other network unit capable to communicate with user equipments being present in the cell over a radio carrier.

A user equipment 120 being present within the cell 115, is served by the base station 110, and is therefore capable of communicating with the base station 110 using a carrier 125 over an air interface. The user equipment 120 may be a terminal, e.g. a mobile terminal or a wireless terminal, a mobile phone, a computer such as e.g. a laptop, Personal Digital Assistants (PDA), or any other radio network units capable to communicate with a base station over the air interface. The carrier 125 comprises multiple component carriers. The user equipment 120 uses a random access procedure before commencing traffic if it has no synchronized uplink.

Figure 3:
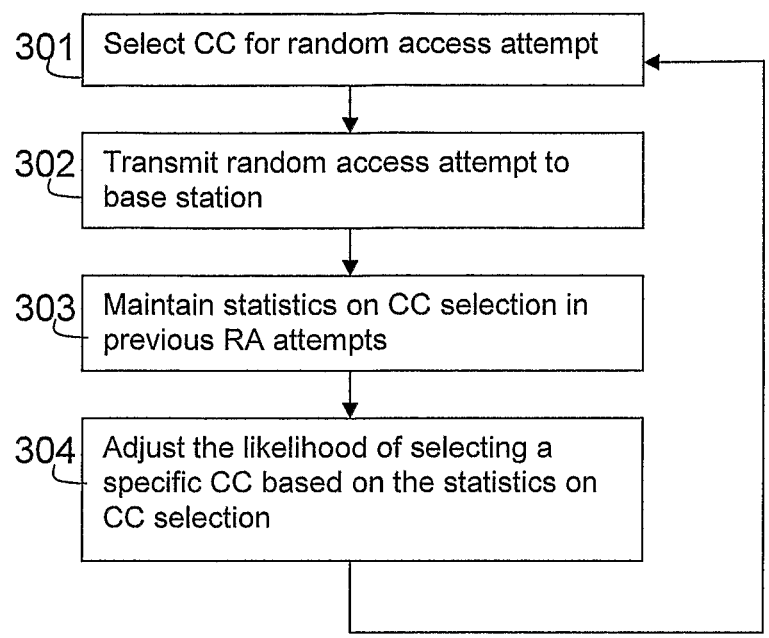
FIG. 3 is a flowchart depicting embodiments of a method in a user equipment.

The present solution relating to a method in the user equipment 120 for selecting component carriers for random access attempts, according to some embodiments will now be described with reference to the flowchart depicted in FIG. 3. As mentioned above, the user equipment 120 is arranged to communicate with the base station 110 over multiple component carriers, which in this example comprises three component carriers which are referred to as CC1, CC2 and CC3. In FIG. 3, a component carrier is referred to as CC. The user equipment 120 wishes to perform some uplink transmission to the base station, e.g. for transmitting some data or voice to the base station 110. The user equipment 120 begins a random access procedure, i.e. it will transmit random access attempts to the base station 110 until a response is received from the base station 120, or until a predetermined total number of random access attempts are performed before declaring a random access problem. The declaring of a random access problem may trigger a declaration of a radio link failure. The method comprises the following steps, which steps may as well be carried out in another suitable order than described below.

Step 301

The user equipment 120 selects a component carrier from the multiple component carriers CC1, CC2, CC3 to be used for a random access attempt. The selection is based on a likelihood. In this example the component carrier denoted CC1 is selected. At the beginning of a new random access procedure all component carriers may be selected with the same likelihood.

Step 302

The user equipment 120 transmits a random access attempt to the base station 110 over the selected component carrier CC1.

Step 303

According to the present solution, the selection likelihood that one component carrier is chosen for the next random access attempt shall depend on how often this component carrier has been selected before in the same random access procedure. Therefore the user equipment 120 maintains statistics of component carriers selected for random access attempts. This is performed per component carrier of the multiple component carriers CC1, CC2, CC3. This may e.g. be performed by a counter, for each component carrier CC1, CC2, CC3, counting each time one of the multiple component carriers CC1, CC2, CC3 is selected. This means that the statistics may be updated each time when a specific component carrier is selected from the multiple component carriers CC1, CC2, CC3 to be used for a random access attempt. The counting of attempts may be reset after a successful attempt or after a radio link failure has been declared.

Step 304

The user equipment 120 adjusts the likelihood of selecting a specific component carrier for a subsequent transmission of a random access attempt based on the maintained statistics. This means that for subsequent attempts if the previous one was not successful, the likelihood distribution is changed, i.e. the likelihood is adjusted.

This means that if the random access was not successful, the user equipment 120 proceeds the random access procedure by performing the method steps 301-304 using the adjusted likelihood for the selection until a response is received from the base station 120, or until the predetermined total number of random access attempts are performed.

In a uniform distribution all component carriers have the same selection likelihood. By taking the statistics, i.e. the history, into account according to the present solution, the likelihood is reduced for selecting a component carrier that have shown bad performance in the past, which e.g. may be an indicator for a systematic problem on this component carrier.

According to a first embodiment, this step 304 of adjusting may be performed by adjusting the likelihood of selecting the specific component carrier for subsequent transmissions of random access attempts by reducing the selection likelihood, when the number of unsuccessful transmitted random access attempts for a specific component carrier comprised in the maintained statistics exceeds a predetermined number N. This means that it is also possible that a certain number of random access attempts may be made on one component carrier before altering the likelihoods. For example, the selection likelihood for a carrier is not altered before N attempts, but after the N-th attempt its selection likelihood is reduced. If a systematic error is faced it is likely that the same component carrier will fail many more times.

In one example, the likelihood of selecting the specific component carrier for subsequent transmissions of random access attempts may be reduced to zero, i.e. after one specific component carrier has been selected N times it cannot be used for the next random access attempts. An advantage with this embodiment is that it is a very simple solution.

A useful definition of a radio link failure counts attempts on all component carriers. Let us assume the user equipment 120 is allowed to perform M random access attempts in total before declaring a radio link failure.

According to the example when the likelihood of selecting the specific component carrier for subsequent transmissions of random access attempts is reduced to zero referred to in the foregoing, after trying to perform random access N times on the same component carrier this component carrier cannot be selected for the next random access attempt(s). In one alternative the N attempts have to occur subsequently in a row. Without any addition to this rule, one component carrier that has been selected N times cannot be re-used until random access succeeds or a radio link failure is declared. Therefore a useful addition to this rule is that after P unsuccessful random access attempts on other component carriers the blocked CC may be used again. I.e., according to this first embodiment, this step 304 of adjusting may further comprise readjusting the likelihood of selecting the specific component carrier for subsequent transmissions of random access attempts by increasing the selection likelihood, when the number of unsuccessful transmitted random access attempts for other component carriers than the specific component carrier comprised in the maintained statistics exceeds a predetermined number P, performed after the adjustment.

Figure 4:
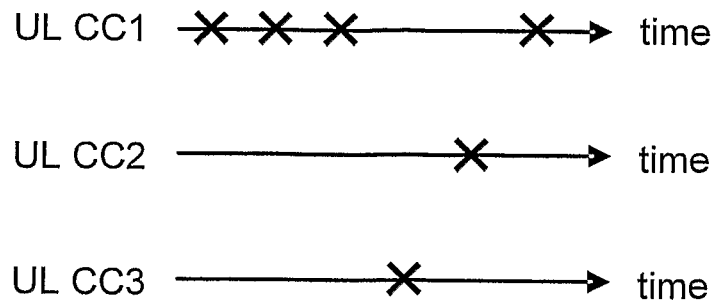
FIG. 4 is a schematic diagram illustrating embodiments of a method in the user equipment.

In FIG. 4, a time axis for each of the respective component carriers CC1, CC2 and CC3 are depicted wherein each random access attempt is indicated by a cross. FIG. 4 shows an example with N=3 and P=2. After three unsuccessful random access attempts the component carrier CC1 is blocked for the next two random access attempts. The user equipment 120 continues to select component carriers randomly (but not uniformly). After being blocked for two attempts the component carrier CC1 has again a selection likelihood larger than zero.

Figure 5:
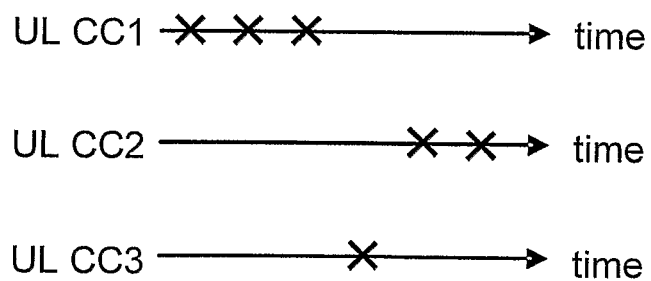
FIG. 5 is a schematic diagram illustrating embodiments of a method in the user equipment.

The alternative where a component carrier is blocked after N unsuccessful attempts until random access succeeds or a radio link failure is declared is shown in FIG. 5. Also in FIG. 5, a time axis for each of the respective component carriers CC1, CC2 and CC3 are depicted wherein each random access attempt is indicated by a cross. After three unsuccessful random access attempts the component carrier CC1 is blocked until random access succeeds or a radio link failure is declared. The user equipment 120 continues to select component carriers randomly, but not uniformly, among CC2 and CC3. In the depicted example the user equipment 120 chooses once the component carrier CC3 and then twice the component carrier CC2.

According to a second embodiment, this step 304 of adjusting is performed by adjusting the likelihood of selecting the specific component carrier for subsequent transmissions of random access attempts, such that the selection likelihood is defined as the number of random access attempts left on a specific component carrier divided by the total number of remaining random access attempts. The total number of random access attempts to be performed before declaring a radio link failure may be predetermined, and this total number of random access attempts may be evenly spread across the multiple component carriers CC1, CC2, CC3.

I.e. instead of having an abrupt behavior of banning a component carrier as described for the first embodiment above, it is also possible to smoothly reduce the selection likelihood of component carriers that have been used previously, which is referred to as the second embodiment. Let us assume that the number of the multiple component carriers is L. Let us further assume that the user equipment 120 can perform M random access attempts before declaring a radio link failure and that these M attempts shall be evenly spread out across the L component carriers. The user equipment 120 may then at the most perform M/L random access attempts in total, not necessarily in successive order, on one component carrier.

In one example, at the first attempt each one of the multiple component carriers is selected with equal likelihood, i.e. 1/L. After several attempts different component carriers have been chosen differently often, lets say the component carrier l has been chosen $k_l$ times, l=1, 2, ..., L. The number of random access attempts left on component carrier l is then $M/L - k_l$. The total number of attempts that has been done so far is $$\sum_{\lambda=1}^{L} k_\lambda$$

and the number of total random access attempts remaining is $$M - \sum_{\lambda=1}^{L} k_\lambda.$$

The selection likelihood $p_l$ for the component carrier l in the next random access attempt may now be defined as random access attempts left on the component carrier l divided by the total number of remaining random access attempts, i.e.

$$p_l = \frac{\frac{M}{L} - k_l}{M - \sum_{\lambda=1}^{L} k_\lambda},$$

$$l = 1, 2, \ldots, L.$$

After the component carrier has been selected M/L times it cannot be selected anymore. Also note that the selection likelihood of component carriers that have never or only seldom been used increases.

Above formula can easily be extended to the case where the number of random access attempts that can be made per the component carrier is not uniformly distributed. Extensions are also possible to the case where the likelihood is altered in a different way. Furthermore it is also possible to modify above formula to the case where each of the component carrier can be used a few times in the beginning without modification of its likelihood.

Figure 6:
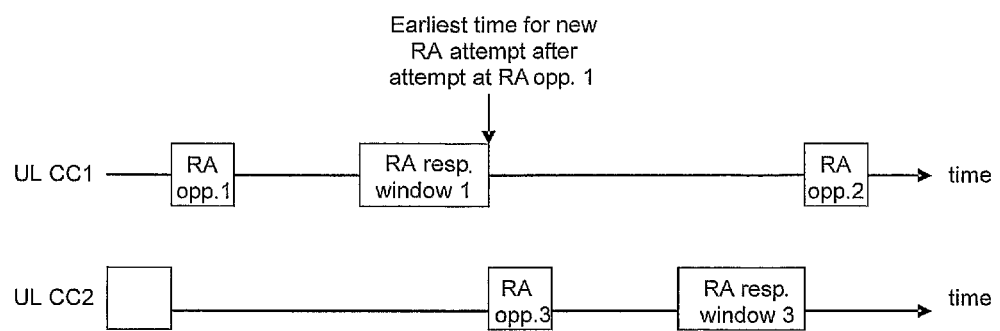
FIG. 6 is a schematic block diagram illustrating embodiments of a method in the user equipment.

The present solution reduces latency. In some embodiments of the present solution, subsequent random access opportunities in time are shifted on the different multiple component carriers CC1, CC2, CC3. This will further reduce the latency. Instead of having random access resources in the same subframes on all the component carriers they may be shifted by a time offset, see FIG. 6. In FIG. 6, a time axis for each of the respective uplink component carriers CC1, CC2 are depicted wherein each random access attempt is indicated and referred to as follows. Random access attempt opportunity 1 is referred to as RA opp.1, random access attempt opportunity 2 is referred to as RA opp.2, and random access attempt opportunity 3 is referred to as RA opp.3. Thus the delay between two successive random access opportunities is reduced, i.e. the time between random access opportunity 1 and 3 is shorter than between 1 and 2. This means that the random access opportunities on different component carriers are shifted in time by an offset. The offset is large enough that a random access response window on component carrier CC1 is finished before the next random access opportunity occurs on the component carrier CC2.

After transmitting the random access preamble in random access opportunity 1 the user equipment 120 requires to know if the random access attempt has been successful. Therefore it has to monitor the downlink for a random access response within a specified random access response window 1 where the random access response can be transmitted. In FIG. 6, the random access response windows for transmitting a response for a specific random access attempt are indicated on the time axis for each of the respective uplink component carriers CC1, CC2 and are referred to as follows: Random access response window 1, is referred to as RA resp. window 1, random access response window 2, is referred to as RA resp. window 2, random access response window 3, and is referred to as RA resp. window 3. Before a random access response window has ended, the user equipment 120 is typically not allowed to perform a new attempt since the old attempt might have been successful and a new preamble transmission would just create unnecessary interference and resource waste.

In the setup shown in FIG. 6, the random access response window 1 on CC1 ends before the next random access opportunity, i.e. before the random access opportunity 3 occurs on CC2. Thus the user equipment 120 is allowed to use the random access opportunity 3 on CC2 which occurs before the next random access opportunity 2 on CC1. Since the time difference between two consecutive random access opportunities is reduced the overall delay will also be shorter.

Figure 7:
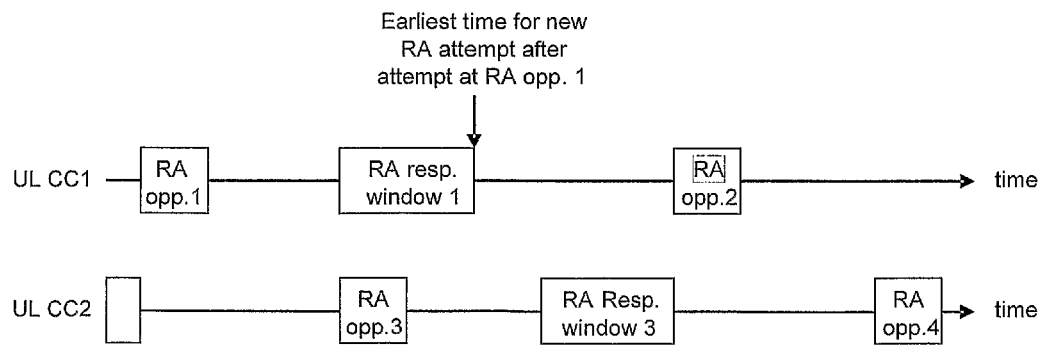
FIG. 7 is a schematic block diagram illustrating embodiments of a method in the user equipment.

An alternative staggering to FIG. 6 is shown in FIG. 7 wherein the random access opportunities on different component carriers are shifted in time by an offset. The offset is so short that a random access response window on component carrier CC1 is not yet finished when the next random access opportunity occurs on CC2. Also in FIG. 7, a time axis for each of the respective uplink component carriers CC1, CC2 are depicted wherein each random access attempt is indicated and referred to as follows. Random access attempt opportunity 1 is referred to as RA opp.1, random access attempt opportunity 2 is referred to as RA opp.2, random access attempt opportunity 3 is referred to as RA opp.3, and random access attempt opportunity 4 is referred to as RA opp.4. In FIG. 7, the random access response windows for transmitting a response for a specific random access attempt are indicated on the time axis for each of the respective uplink component carriers CC1, CC2 and are referred to as follows: Random access response window 1, is referred to as RA resp. window 1, random access response window 2, is referred to as RA resp. window 2, random access response window 3, is referred to as RA resp. window 3, and random access response window 4, is referred to as RA resp. window 4. Here in FIG. 7, the offset between the component carriers CC1 and CC2 is shorter. What might seem beneficial at a first glance is actually counter productive: When the random access opportunity 3 occurs on the component carrier CC2 the user equipment 120 does not yet know if the previous attempt made in random access opportunity 1 on the component carrier CC1 has been successful. The user equipment 120 is therefore not allowed to use the immediately next opportunity on the component carrier CC2 and reverts back to the random access opportunity 2 on the component carrier CC1. Even though the user equipment 120 could perform random access on two component carriers it will anyway perform random access just on one component carrier which may result in unnecessary attempts if the initial transmission power has been set wrongly on component carrier CC1 but not on component carrier CC2. Furthermore frequency diversity is lost.

The present solution resolves this problem. Referring to FIG. 7, for simplicity it is the first embodiment that is assumed but it should be noted that also the second embodiment may be used to resolve this issue. The application of the first embodiment blocks the component carrier CC1 after N unsuccessful attempts. The N+1-th random access attempt occurs therefore on the component carrier CC2. Even though the user equipment 120 has to wait slightly longer for the random access opportunity 4 on CC2 it is beneficial to do so because of the obtained frequency diversity.

In addition to reduced latency also load balancing is restored since random access attempts are now again distributed on the multiple component carriers CC1 and CC2.

The random access opportunities in the user equipment 120 may be configured by the base station 110 such as e.g. an eNodeB but the user equipment 120 itself performs the modifications of the selection likelihoods. According to a specific embodiment, the base station 110 may signal to the user equipment 120 if the user equipment 120 should use e.g. uniform distribution or modified selection likelihoods. In addition, if the user equipment 120 should use modified likelihoods the base station 110 such as the eNodeB may also signal parameters how to calculate new selection likelihoods.

Figure 8:
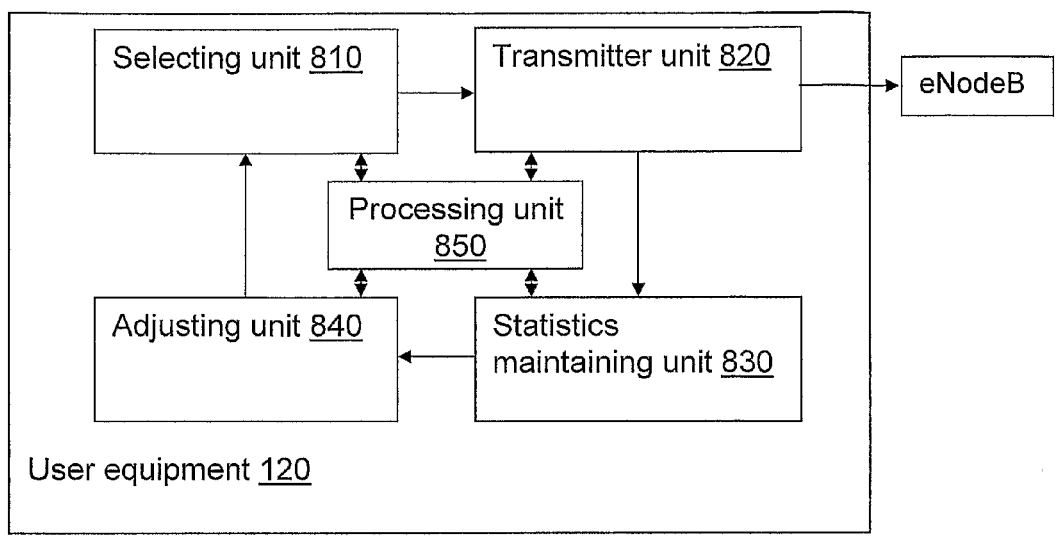
FIG. 8 is a schematic block diagram illustrating embodiments of a user equipment.

To perform the method steps above for selecting component carriers for random access attempts, the user equipment 120 comprises an arrangement depicted in FIG. 8, schematically illustrating an embodiment of the arrangement according to the invention. As mentioned above, the user equipment 120 is arranged to communicate with the base station 110 over multiple component carriers CC1, CC2, CC3. The term "configured to" used herein may also be referred to as "arranged to".

The user equipment 120 comprises a selecting unit 810 configured to select a component carrier CC1 from the multiple component carriers CC1, CC2, CC3, based on a likelihood.

The user equipment 120 further comprises a transmitter unit 820 configured to transmit a random access attempt to the base station 110 over the selected component carrier CC1. The total number of random access attempts to be performed before declaring a random access problem may be predetermined. The declaring of a random access problem may trigger a declaration of a radio link failure.

The user equipment 120 further comprises a statistics maintaining unit 830 configured to maintain statistics of component carriers selected for random access attempts per component carrier of the multiple component carriers CC1, CC2, CC3.

The user equipment 120 further comprises an adjusting unit 840 configured to adjust the likelihood of selecting a specific component carrier for a subsequent transmission of a random access attempt based on the maintained statistics.

In some embodiments, subsequent random access opportunities in time are shifted on the different multiple component carriers CC1, CC2, CC3.

In some embodiments, the adjusting unit 840 further is configured to adjust the likelihood of selecting the specific component carrier for subsequent transmissions of random access attempts by reducing the selection likelihood, when the number of unsuccessful transmitted random access attempts for a specific component carrier comprised in the maintained statistics exceeds a predetermined number N.

According to the first embodiment, the adjusting unit 840 further is configured to reduce the likelihood of selecting the specific component carrier for subsequent transmissions of random access attempts to zero.

The adjusting unit 840 may further be configured to readjust the likelihood of selecting the specific component carrier for subsequent transmissions of random access attempts by increasing the selection likelihood, when the number of unsuccessful transmitted random access attempts for other component carriers than the specific component carrier comprised in the maintained statistics exceeds a predetermined number P, performed after the adjustment.

According to the second embodiment, the total number of random access attempts is evenly spread across the multiple component carriers CC1, CC2, CC3. In this embodiment, the adjusting unit 840 is further configured adjust the likelihood of selecting the specific component carrier for subsequent transmissions of random access attempts, such that the selection likelihood is defined as the number of random access attempts left on a specific component carrier divided by the total number of remaining random access attempts.

The present mechanism for selecting component carriers for random access attempts may be implemented through one or more processors, such as a processing unit 850, e.g. a DSP Digital Signal Processor, in the user equipment 120 depicted in FIG. 8, together with computer program code for performing the functions of the present solution. The program code mentioned above may also be provided as a computer program product, for instance in the form of a data carrier carrying computer program code for performing the present solution when being loaded into the user equipment 120. The computer product may be in the form of a non-volatile memory, e.g. an EEPROM, a flash memory and a disk drive. It is however feasible with other data carriers such as a memory stick. The computer program code may furthermore be provided as pure program code on a server and downloaded to the user equipment 120.

The arrangement may further comprise an encoding and a decoding module, and an input unit and an output unit. The input unit and the output unit may be arranged as one in the hardware of the arrangement.

Hence in the exemplary embodiments described, the code means in the computer program comprises a selecting module for selecting a component carrier for a random access attempt; a transmitting module; a statistic maintaining module for maintaining statistics on previously used component carriers; and an adjusting module for adjusting the likelihood of selecting a specific component carrier, for random access dependent on how frequent said component carrier has been selected in previous random access attempts in the form of computer program code structured in computer program modules. In other words, when the different modules are run on the processing unit, they correspond to the corresponding units depicted in FIG. 8.

Thus, embodiments of the invention enable frequency diversity for random access. The number of random access attempts is reduced in case of a wrong initial power setting on one component carrier since the likelihood increases that the user equipment will use another component carrier for the next random access attempt. To summarize, the present solution reduces latency for random access.

Embodiments of the invention also help to restore frequency diversity and load balancing in scenarios where random access opportunities are staggered on the different component carriers.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a user equipment for selecting component carriers for random access attempts, wherein the user equipment is arranged to communicate with a base station over multiple component carriers, the method comprising:
   selecting a component carrier from the multiple component carriers, based on a selection likelihood for the selected component carrier;
   transmitting a random access attempt to the base station over the selected component carrier;
   maintaining statistics of component carriers selected for random access attempts per component carrier of the multiple component carriers; and
   adjusting a likelihood of selecting a specific component carrier for a subsequent transmission of a random access attempt based on the maintained statistics;
   wherein said adjusting is performed by adjusting the likelihood of selecting the specific component carrier for subsequent transmissions of random access attempts by reducing the likelihood of selecting the specific component carrier when a number of unsuccessful transmitted random access attempts for the specific component carrier comprised in the maintained statistics exceeds a predetermined number N, and wherein said adjusting further comprises readjusting the likelihood of selecting the specific component carrier for subsequent transmissions of random access attempts by increasing the likelihood of selecting specific component carrier when a number of unsuccessful transmitted random access attempts for other component carriers than the specific component carrier comprised in the maintained statistics exceeds a predetermined number P, performed after the adjustment.

2. The method of claim 1, wherein subsequent random access opportunities in time are shifted on different multiple component carriers.

3. The method of claim 1, wherein the likelihood of selecting the specific component carrier for subsequent transmissions of random access attempts is reduced to zero.

4. A method in a user equipment for selecting component carriers for random access attempts, wherein the user equipment is arranged to communicate with a base station over multiple component carriers, the method comprising:
   selecting a component carrier from the multiple component carriers, based on a selection likelihood for the selected component carrier;
   transmitting a random access attempt to the base station over the selected component carrier;
   maintaining statistics of component carriers selected for random access attempts per component carrier of the multiple component carriers; and
   adjusting a likelihood of selecting a specific component carrier for a subsequent transmission of a random access attempt based on the maintained statistics;
   wherein a total number of random access attempts to be performed before declaring a random access problem is predetermined, wherein the total number of random access attempts is evenly spread across the multiple component carriers, and wherein said adjusting is performed by: adjusting the likelihood of selecting the specific component carrier for subsequent transmissions of random access attempts such that the likelihood of selecting the specific component carrier is defined as a number of random access attempts left on the specific component carrier divided by a total number of remaining random access attempts.

5. The method of claim 4, wherein declaring the random access problem triggers a declaration of a radio link failure.

6. A user equipment for selecting component carriers for random access attempts, which user equipment is arranged to communicate with a base station over multiple component carriers, the user equipment comprising a processor coupled to a memory configured to:
   select a component carrier from the multiple component carriers, based on a selection likelihood for the selected component carrier;
   transmit a random access attempt to the base station over the selected component carrier;
   maintain statistics of component carriers selected for random access attempts per component carrier of the multiple component carriers; and
   adjust a likelihood of selecting a specific component carrier for a subsequent transmission of a random access attempt based on the maintained statistics, wherein the processor is configured to adjust the likelihood of selecting the specific component carrier for subsequent transmissions of random access attempts by reducing the likelihood of selecting the specific component carrier when a number of unsuccessful transmitted random access attempts for the specific component carrier comprised in the maintained statistics exceeds a predetermined number N, and wherein the processor is further configured to readjust the likelihood of selecting the specific component carrier for subsequent transmissions of random access attempts by increasing the likelihood of selecting the specific component carrier when a number of unsuccessful transmitted random access attempts for other component carriers than the specific component carrier comprised in the maintained statistics exceeds a predetermined number P, performed after the adjustment.

7. The user equipment of claim 6, wherein the processor is configured to reduce the likelihood of selecting the specific component carrier for subsequent transmissions of random access attempts to zero.

8. The user equipment of claim 6, wherein subsequent random access opportunities in time are shifted on different multiple component carriers.

9. A user equipment for selecting component carriers for random access attempts, which user equipment is arranged to communicate with a base station over multiple component carriers, the user equipment comprising a processor coupled to a memory configured to:
   select a component carrier from the multiple component carriers, based on a selection likelihood for the selected component carrier;
   transmit a random access attempt to the base station over the selected component carrier;
   maintain statistics of component carriers selected for random access attempts per component carrier of the multiple component carriers; and
   adjust a likelihood of selecting a specific component carrier for a subsequent transmission of a random access attempt based on the maintained statistics;
   wherein a total number of random access attempts to be performed before declaring a random access problem is predetermined, wherein the total number of random access attempts is evenly spread across the multiple component carriers, and wherein the processor is further configured to adjust the likelihood of selecting the specific component carrier for subsequent transmissions of random access attempts, such that the likelihood of selecting the specific component carrier is defined as a number of random access attempts left on the specific component carrier divided by a total number of remaining random access attempts.

10. The user equipment of claim 9, wherein declaring random access problem triggers a declaration of a radio link failure.

* * * * *